United States Patent
Cheng

(10) Patent No.: US 6,351,379 B1
(45) Date of Patent: Feb. 26, 2002

(54) EXTRACTING AND POSITIONING STRUCTURE FOR HARD DISK DRIVE

(75) Inventor: Kuang Jui Cheng, Taipei (TW)

(73) Assignee: Lite-On Enclosure Inc., Taipei (TW)

( * ) Notice: Subject to any disclaimer, the term of this patent is extended or adjusted under 35 U.S.C. 154(b) by 13 days.

(21) Appl. No.: 09/634,293

(22) Filed: Aug. 9, 2000

(51) Int. Cl.$^7$ ................................................ H05K 7/16
(52) U.S. Cl. ........................ 361/685; 361/726; 361/727; 312/332.1; 364/708.1
(58) Field of Search ............................... 361/683, 685, 361/684, 726, 727, 740, 747, 692, 693, 816, 818, 724–725; 312/332.1, 333, 323.1, 323.2, 323.3, 330.1, 334.23, 324.26, 334.27, 334.26; 211/26; 364/708.1; 439/353, 377, 926.1, 152–157; 360/137 D; 174/35 R, 35 GC

(56) References Cited

U.S. PATENT DOCUMENTS

| 5,117,661 A | * | 6/1992 | Cari et al. ..................... 70/158 |
| 5,340,340 A | * | 8/1994 | Hastings et al. ............... 439/64 |
| 5,588,728 A | * | 12/1996 | Eldridge et al. ......... 312/332.1 |

* cited by examiner

*Primary Examiner*—Leo P. Picard
*Assistant Examiner*—Michael Datskovsky
(74) *Attorney, Agent, or Firm*—Rosenberg, Klein & Lee

(57) ABSTRACT

The present invention proposes an extracting and positioning structure for a hard disk drive suitable to an industrial computer. In the present invention, two side frame boards to fix at least a hard disk drive are installed on a frame of a computer. Latticed partitioning plates are installed on the frame boards. The present invention has at least an extractable case with fixing bars installed at two sides thereof to fix a hard disk drive therein. A U-shaped plate is installed at each side of the front half section of the extractable case. Pivotal holes are respectively disposed at the top and bottom surfaces of the U-shape plate to pivotally connect a spindle protruding out of the top and bottom surfaces of a pivotal retaining element. A fixing shaft protruding out of the top and bottom surfaces at the other end of the pivotal retaining element. A slide lever is transversely arranged in the U-shaped plate at the front end of the extractable case. Transverse grooves extend from the side end surfaces at the two ends of the slide lever, respectively. Slide grooves are disposed in the transverse grooves to pivotally connect the fixing shaft to push the slide lever backwards. The other end of the pivotal retaining element will thus be pushed out of a groove hole at the side surface of the U-shaped plate and a retaining groove at the other end of the pivotal retaining element will be secured on the side frame boards. The extractable case of the hard disk drive can be extracted out by pulling the slide lever forwards.

3 Claims, 5 Drawing Sheets

EXTRACTING AND POSITIONING STRUCTURE FOR HARD DISK DRIVE

FIELD OF THE INVENTION

The present invention relates to an extracting and positioning structure for a hard disk drive and, more particularly, to a fixing structure having simpler but better positioning effect and suitable to an extractable hard disk drive used in an industrial computer.

BACKGROUND OF THE INVENTION

An extractable hard disk drive in prior art comprises a hard disk drive, an inner case for receiving the hard disk drive, and a fixing seat. The fixing seat can slide in or out between a pair of fins of fixing racks in the housing of a computer. Generally, the fixing seat is fixedly screwed while the inner case slides in or out of the fixing seat to achieve the object of replacing the hard disk drive conveniently. The inner case is also replaced along with the hard disk drive. To facilitate the extraction of the inner case, a grip is installed at the outer end surface of the inner case. The grip can provide convenience for gripping and taking and is the position for exerting the extraction force. However, there is positioning problem between the inner case and the fixing seat. A connector at the inner end of the inner case must be joined with a corresponding connector on the fixing seat. Only when the two connectors are joined can input and output of information signals of the hard disk drive be achieved. In prior art, to let the two connectors be successfully joined, a raised part is installed at the tail end of the grip. After the inner case is completely plugged in the fixing seat, the pivotal grip is placed down so that the raise part is secured in a corresponding hole disposed at the top surface of the fixing seat. However, this kind of positioning in prior art has only the function of retaining the inner case to prevent it from sliding out. The tail end of the grip needs to be longer and more raised. Some users may release the grip and push the faceplate of the inner case when the inner case is just placed in the fixing seat so that the raised part may be broken or the fixing seat may be damaged. The inner case will thus lose the positioning function.

SUMMARY AND OBJECTS OF THE PRESENT INVENTION

The object of the present invention is to provide an extracting and positioning structure for a hard disk drive. For an industrial computer, because a large amount of data needs to be proceeded, a disk raid of hard disk drives are generally installed, some used for storing back-up files, some used for storing working files, while some used for storing data files. There are many opportunities of replacing the hard disk drives. If the method of prior art is adopted, inconvenience and bulkiness may arise in use. The present invention can provide an extractable case with a simpler structure to bear the hard disk drive. Moreover, through the operation of a pair of pivotal retaining elements matched with a slide lever, the pivotal retaining elements can be positioned on side frame boards of the frame of a computer so that the extractable case can be fixed and positioned.

In the present invention, two side frame boards to fix at least a hard disk drive are installed on the frame of a computer. Latticed partitioning plates are installed on the frame boards. The present invention has at least an extractable case with fixing bars installed at two sides thereof to fix a hard disk drive therein. A U-shaped plate is installed at each side of the front half section of the extractable case. Pivotal holes are respectively disposed at the top and bottom surfaces of the U-shape plate to pivotally connect a spindle protruding out of the top and bottom surfaces of a pivotal retaining element. A fixing shaft protrudes out of the top and bottom surfaces at the other end of the pivotal retaining element. A slide lever is transversely arranged in the U-shaped plate at the front end of the extractable case. Transverse grooves extend from the side end surfaces at the two ends of the slide lever, respectively. Slide grooves are disposed in the transverse grooves to pivotally connect the fixing shaft to push the slide lever backwards. The other end of the pivotal retaining element will thus be pushed out of a groove hole at the side surface of the U-shaped plate and a retaining groove at the other end of the pivotal retaining element will be secured on the side frame boards. The extractable case of the hard disk drive can be extracted out by pulling the slide lever forwards.

The various objects and advantages of the present invention will be more readily understood from the following detailed description when read in conjunction with the appended drawings, in which:

DETAILED DESCRIPTION OF PREFERRED EMBODIMENT

Figure 1:
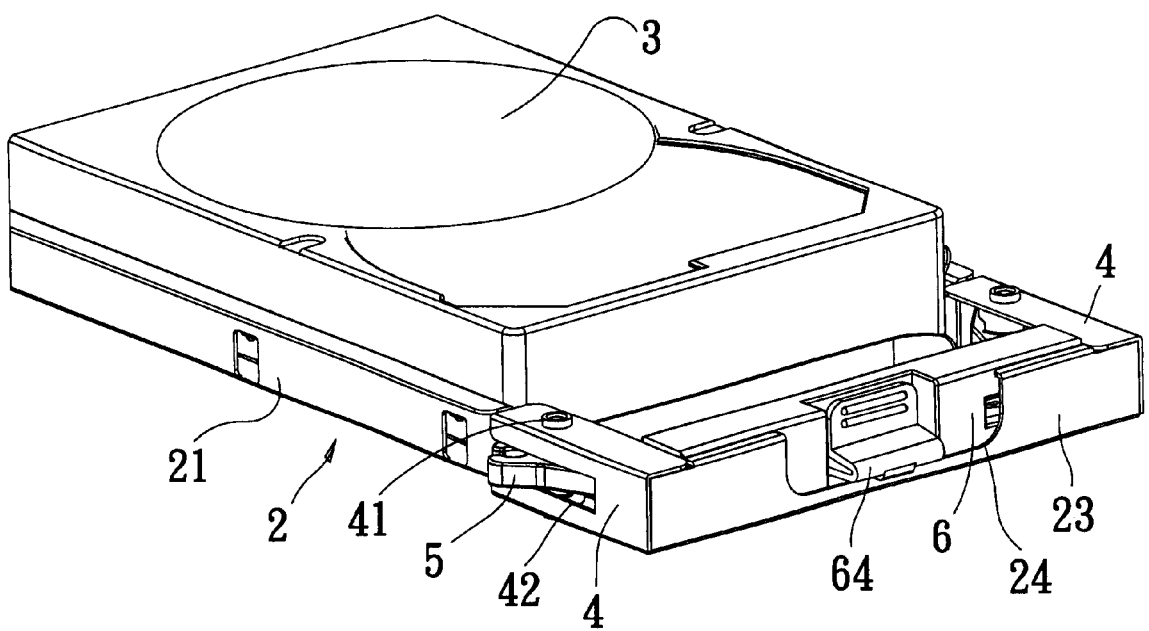
FIG. 1 is a perspective view of the present invention.
Figure 2:
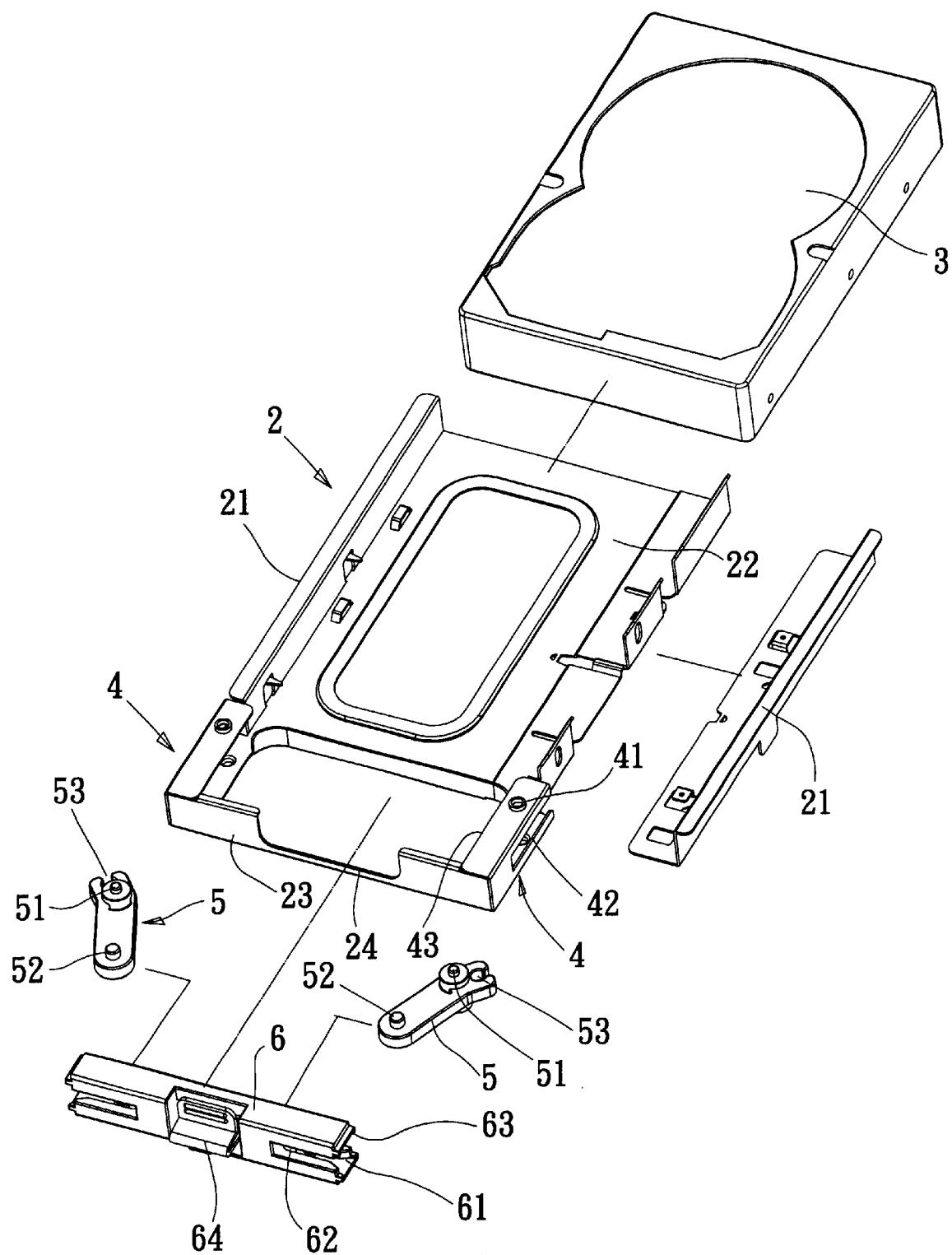
FIG. 2 is an exploded perspective view of the present invention.

As shown in FIGS. 1 to 6, the present invention proposes an extracting and positioning structure for a hard disk drive suitable to an industrial computer. Two side frame boards 12 are installed in a frame 11 of a computer 1 to receive and fix at least a hard disk drive. Latticed partitioning plate 13 is installed on the frame boards 12. The present invention has at least an extractable case 2. A fixing bar 21 is installed at each side of the extractable case 2. A hard disk drive 3 is joined with the fixing bars 21 to be fixed in the extractable case 2. The joining positions of the hard disk drive 3 are near the rear of the extractable case 2 where the extractable case 2 has a bottom board 22. Two sides of the hard disk drive 3 are fixedly screwed with the fixing bars 21 via screws. U-shaped plates 4 are arranged at two sides of the front half section of the extractable case 2, respectively. Pivotal holes 41 are disposed at the top and bottom surfaces of the U-shaped plates 4, respectively. The pair of pivotal holes 41 are used to pivotally connect a spindle 51 protruding out of the top and bottom surfaces of a pivotal retaining element 5. A fixing shaft 52 protrudes out of the top and bottom surfaces at the other end of the pivotal retaining element 5. The present invention has a slide lever 6 corresponding to the extractable case 2. The slide lever 6 is transversely arranged in the U-shaped plates 4 at the front end of the fixing bars 21 of the extractable case 2. Transverse grooves 61 extend from the side end surfaces at the two ends of the slide lever 6, respectively. Slide grooves 62 are disposed in the transverse grooves 61 to pivotally connect the fixing shaft 52 of the pivotal retaining element 5 so that the other end of the pivotal retaining element 5 can be placed in a groove hole 42 inalled at the side surface of the U-shaped plate 4. When the slide lever 6 is pushed backwards, a retaining groove 53 at the other end of the pivotal retaining element 5 will be fastened on the retaining bars 14 on the side frame boards 12. The extractable case 2 of the hard disk drive 3 can be extracted out by pulling the slide lever 6 forwards to release the fastening state. Notched grooves 63 are disposed at the top and bottom surfaces at two ends of the slide lever 6 to be joined with inner edges 43 extending inwards from the U-shaped plates at the top and bottom surfaces thereof. The openings of the notched grooves 63 are transverse and the end of the notched grooves 63 near the pivotal retaining element 5 is shorter. A grip part 64 is installed at the front end of the middle of the slide lever 6. The grip part 64 extends from near the bottom surface to form a long sheet whose middle is folded to form a projecting tip. The front end of the extractable case 2 is folded upwards to form a front end surface 23. The front end surface 23 has a notch 24 so that the grip part 64 can be gripped. The fixing shaft 52 of the pivotal retaining element 5 slides in an openings 65 of the slide grooves 62 and can move about in the slide grooves 62 according to the movement of the slide lever 6. The pivotal retaining element 5 can thus be turned with the pivotal shaft 61 as the axis.

Figure 3:
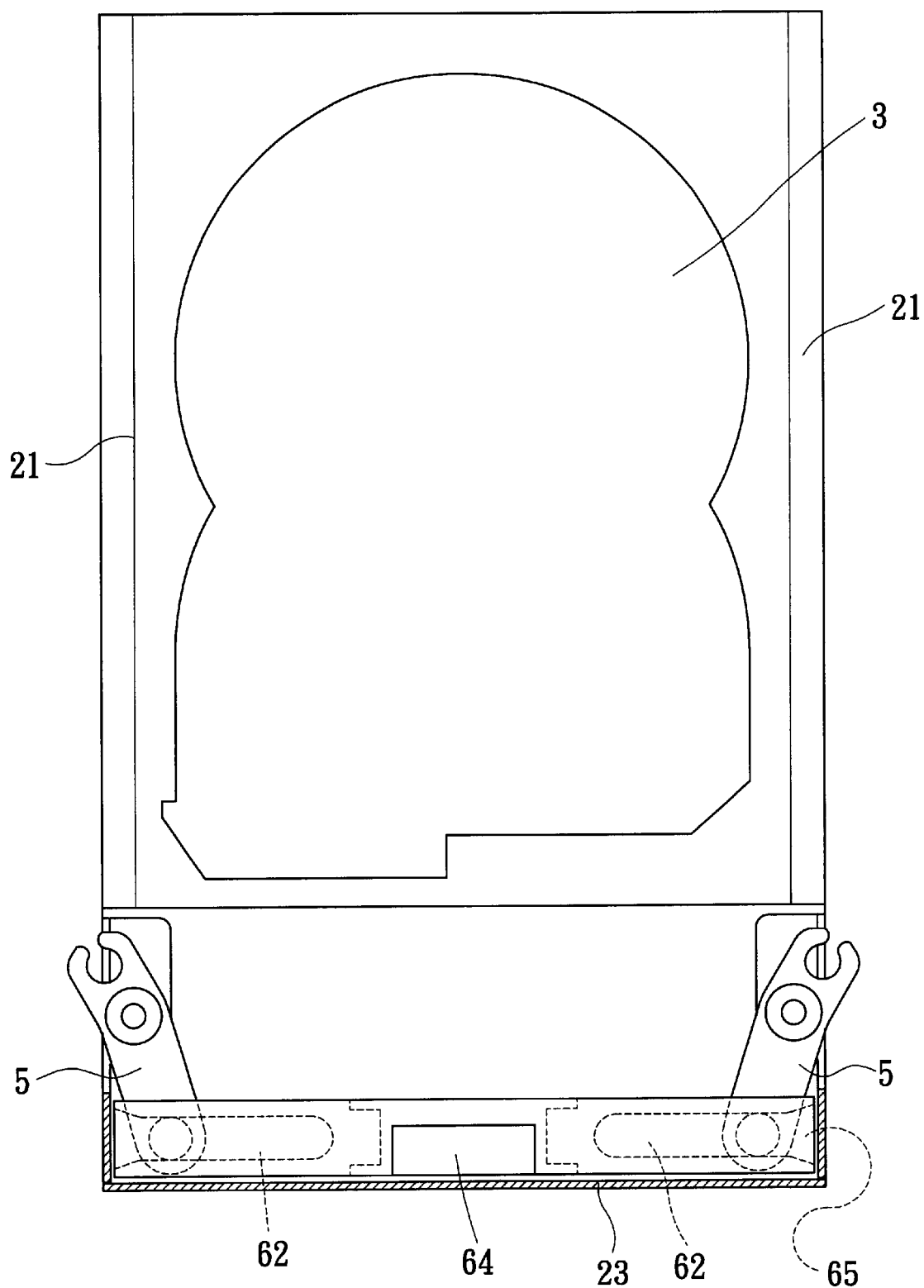
FIG. 3 is a top cross-sectional view of the present invention.
Figure 4:
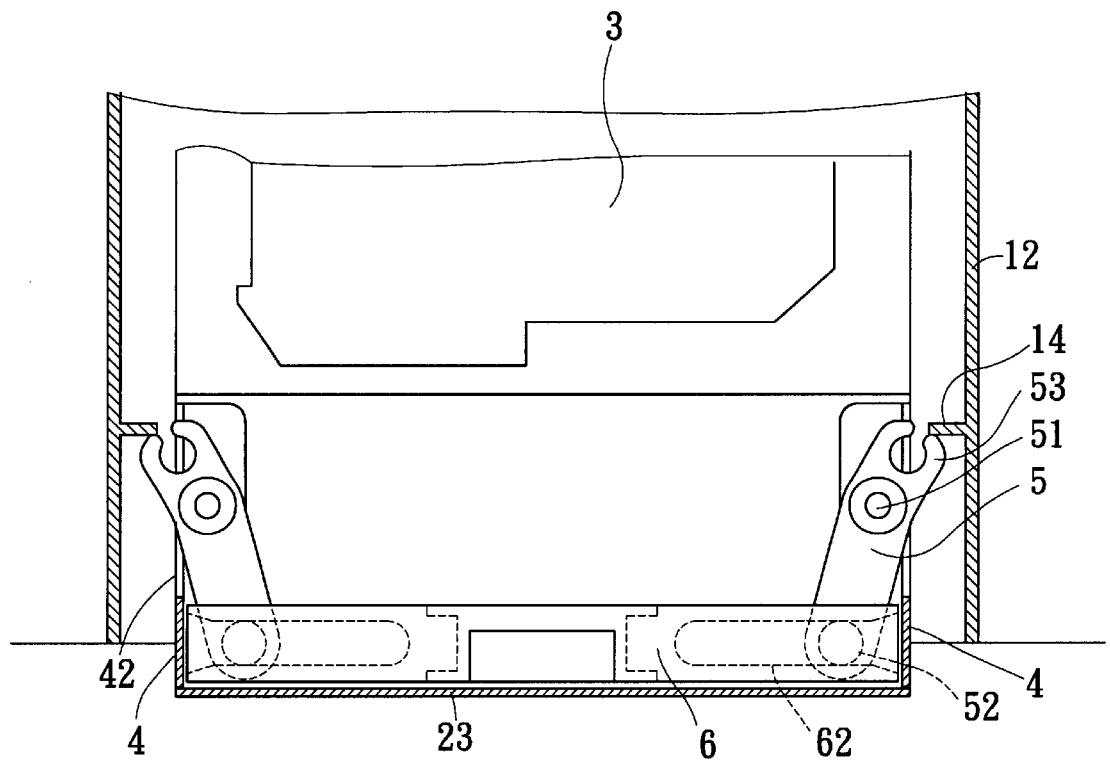
FIG. 4 is a top cross-sectional view of the present invention when the pivotal retaining element is not yet fastened on the retaining bar.
Figure 5:
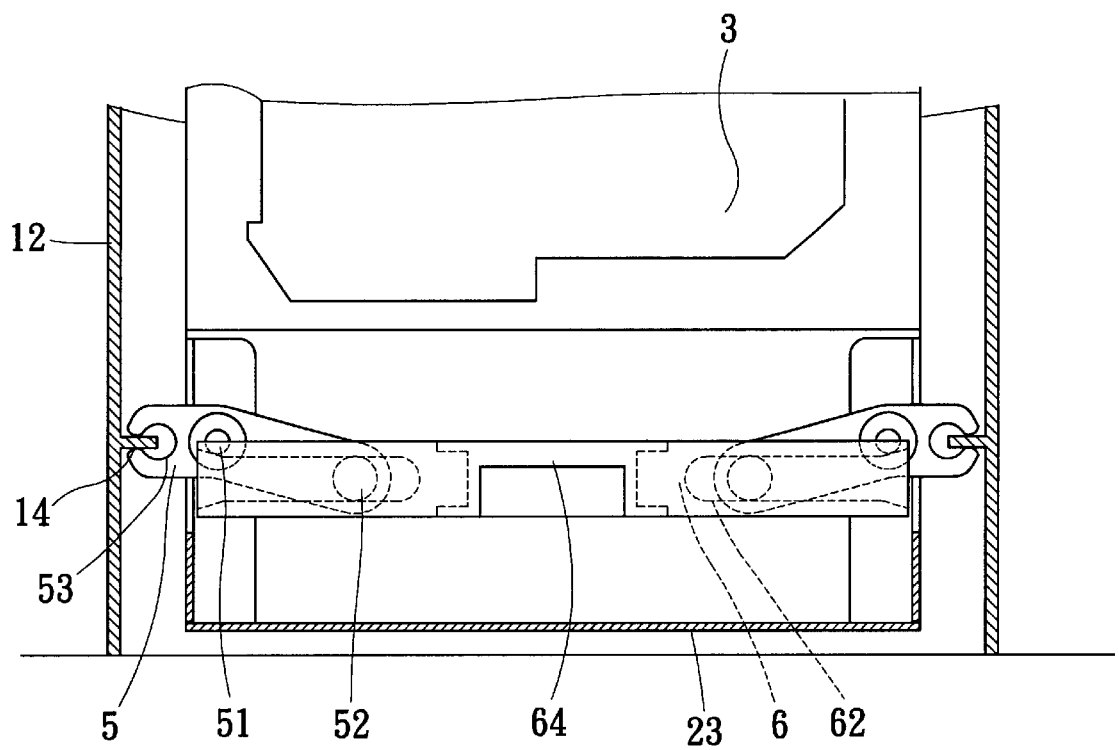
FIG. 5 is a top cross-sectional view of the present invention when the pivotal retaining element is already fastened on the retaining bar.
Figure 6:
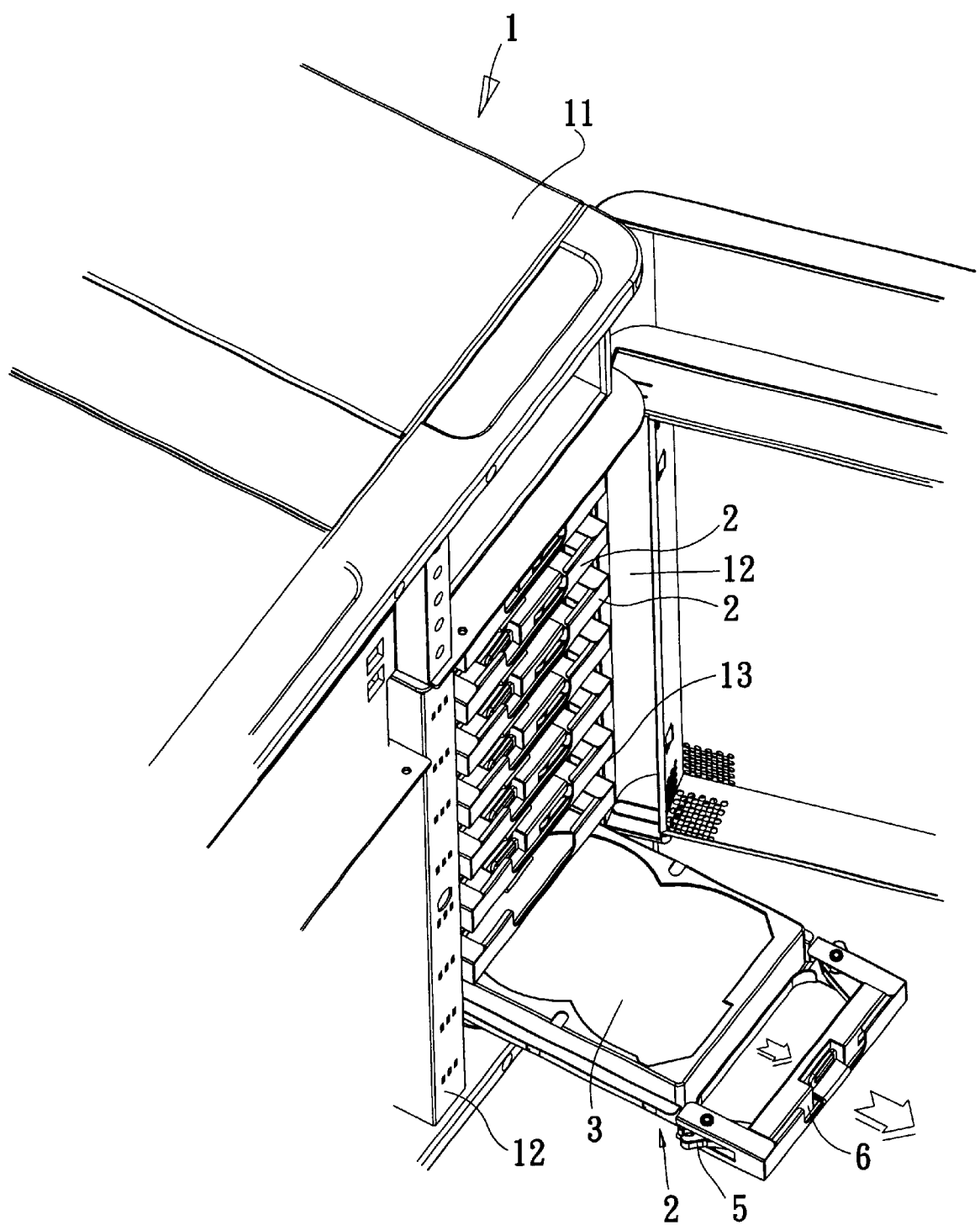
FIG. 6 is a perspective view according to an embodiment of the present invention.

Summing up, the present invention uses a pair of pivotal retaining element matched with a slide lever to achieve the extracting and positioning functions. As shown in FIGS. 3 to 5, the present invention uses the slide lever as the source of driving force. No matter pulled forwards or pushed backwards, the pivotal retaining element rotates accordingly and moves about in limited space. The present invention is characterized in that the two ends of the pivotal retaining element are not of the same length to facilitate the application of the force. That is, the end of the pivotal retaining element corresponding to the retaining groove is very short to fasten the retaining groove easily on the retaining bars 14 of the side frame boards 12. The fastening state can also be easily released in the opposite direction.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An extracting and positioning structure for a hard disk drive, two side frame boards being installed in a frame of a computer to receive and fix at least a hard disk drive, latticed partitioning plates being installed on said frame boards, a fixing bar being installed at each side of an extractable case, a hard disk drive being joined with said fixing bars to be fixed in said extractable case, U-shaped plates being respectively arranged at two sides of the front half section of said extractable case, pivotal holes being respectively disposed at the top and bottom surfaces of said U-shaped plates, said pivotal holes being used to pivotally connect a spindle protruding out of the top and bottom surfaces of a pivotal retaining element, a fixing shaft protruding out of the top and bottom surfaces at the other end of said pivotal retaining element, a slide lever corresponding to said extractable case, said slide lever being transversely arranged in said U-shaped plates at the front end of said fixing bars of said extractable case, transverse grooves respectively extending from the side end surfaces at the two ends of said slide lever, slide grooves being disposed in said transverse grooves to pivotally connect said fixing shaft of said pivotal retaining element so that the other end of said pivotal retaining element can be placed in a groove hole installed at the side surface of said U-shaped plate, whereby when said slide lever is pushed backwards, a retaining groove at the other end of said pivotal retaining element will be fastened on said retaining bars of said side frame boards, and said extractable case of said hard disk drive can be extracted out by pulling said slide lever forwards to release the fastening state.

2. The positioning structure for an extractable hard disk drive of claim 1, wherein notched grooved are disposed at the top and bottom surfaces at two ends of said slide lever to be joined with inner edges extending inwards from said U-shaped plates at the top and bottom surfaces thereof.

3. The positioning structure for an extractable hard disk drive of claim 1, wherein a grip part is installed at the front end of the middle of said slide lever.

* * * * *